(12) United States Patent
Jung et al.

(10) Patent No.: US 7,613,303 B2
(45) Date of Patent: Nov. 3, 2009

(54) CONTROLLING DELIVERY OF BROADCAST ENCRYPTION CONTENT FOR A NETWORK CLUSTER FROM A CONTENT SERVER OUTSIDE THE CLUSTER

(75) Inventors: Eunjin Jung, Austin, TX (US); Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/164,953

(22) Filed: Jun. 30, 2008

(65) Prior Publication Data

US 2008/0253574 A1 Oct. 16, 2008

Related U.S. Application Data

(63) Continuation of application No. 10/815,207, filed on Mar. 31, 2004, now Pat. No. 7,412,063.

(51) Int. Cl.
H04L 9/14 (2006.01)
(52) U.S. Cl. ...................................... 380/281
(58) Field of Classification Search ............... 380/281; 713/181
See application file for complete search history.

(56) References Cited

U.S. PATENT DOCUMENTS

| 2003/0198351 | A1 | 10/2003 | Foster et al. |
| 2005/0086532 | A1 | 4/2005 | Lotspiech et al. |
| 2006/0126831 | A1 | 6/2006 | Cerruti et al. |

FOREIGN PATENT DOCUMENTS

EP 1045585 A1 10/2000

OTHER PUBLICATIONS

Office Action Dated Apr. 1, 2008 in U.S. Appl. No. 10/926,599.
Shapiro et al.; How to Manage Persistent State In DRM Systems; Technical Report STAR-TR-01-06; Aug. 2001; pp. 1-11; InterTrust Technologies Corporation; US.
Lotspiech et al.; Broadcast Encryption's Bright Future; Aug. 2002; pp. 57-63; IEEE; US.
CPSA; A Comprehensive Framework For Content Protection; Feb. 17, 2000; pp. 1-19; Intel Corporation, et al.; US.
Content Protection System With Media Key Block For Video-On-Demand; Article No. 455171; Mar. 2002; pp. 526-530; Research Disclosure; US.
xCP: eXtensible Content Protection; 2003; pp. 1-5; IBM Research Division Almaden Research Center; IBM; US.
Content Protection System With Public Key Block For Video-On-Demand; Article No. 455168; Mar. 2002; pp. 524-526; Research Disclosure; US.

(Continued)

*Primary Examiner*—Emmanuel L Moise
*Assistant Examiner*—Tamara Teslovich
(74) *Attorney, Agent, or Firm*—H. Artoush Ohanian; Justin Dillon; Biggers & Ohanian LLP.

(57) ABSTRACT

Controlling delivery of broadcast encryption content for a network cluster from a content server outside the cluster that include receiving in the content server from the network device a key management block for the cluster, a unique data token for the cluster, and an encrypted cluster id and calculating a binding key for the cluster in dependence upon the key management block for the cluster, the unique data token for the cluster, and the encrypted cluster id. In typical embodiments, calculating a binding key includes calculating a management key from the key management block for the cluster; calculating a content server device key from the management key and the content server device id; decrypting the encrypted cluster id with the content server device key; and calculating the binding key with the management key, the unique data token for the cluster, and the cluster id.

2 Claims, 4 Drawing Sheets

CONTROLLING DELIVERY OF BROADCAST ENCRYPTION CONTENT FOR A NETWORK CLUSTER FROM A CONTENT SERVER OUTSIDE THE CLUSTER

CROSS-REFERENCE TO RELATED APPLICATION

This application is a continuation application of and claims priority from U.S. patent application Ser. No. 10/815,207, filed on Mar. 31, 2004.

BACKGROUND OF THE INVENTION

1. Field of the Invention

The field of the invention is data processing, or, more specifically, methods, systems, and products for controlling delivery of broadcast encryption content for a network cluster from a content server outside the cluster.

2. Description of Related Art

With the advent of consumer digital technology, content such as music and movies are no longer bound to the physical media that carry it. Advances in consumer digital technology presents new challenges to content owners such as record labels, studios, distribution networks, and artists who want to protect their intellectual property from unauthorized reproduction and distribution. Recent advances in broadcast encryption offer an efficient alternative to more traditional solutions based on public key cryptography. In comparison with public key methods, broadcast encryption requires orders of magnitude less computational overhead in compliant devices. In addition, broadcast encryption protocols are one-way, not requiring any low-level handshakes, which tend to weaken the security of copy protection schemes.

IBM has developed a content protection system based on broadcast encryption called eXtensible Content Protection, referred to as "xCP." xCP supports a trusted domain called a 'cluster' that groups together a number of compliant devices. Content can freely move among these devices, but it is useless to devices that are outside the cluster.

Each compliant device is manufactured with a set of device keys. A key management block ("KMB") is a data structure containing an encryption of a management key using every compliant device key in the set of device keys for a compliant device. That is, a KMB contains a multiplicity of encrypted instances of a management key, one for every device key in the set of device keys for a device. Each compliant device, using one of its own device keys, is capable of extracting an encrypted management key from a key management block and decrypting it. That is, the management key for a cluster is calculated from the key management block, and it is the ability to calculate a management key from a key management block that distinguishes compliant devices.

A cluster is a private domain. Compliant devices can join a cluster. Some compliant devices in a cluster have specialized functions. Most devices do not store key management blocks; they read key management blocks from the cluster. A 'kmb-server,' however, is a device that stores the key management block and can update it. 'Authorizers' are network devices that can authorize other devices to join a cluster. In a compliant cluster, when a consumer purchases a device and installs it in his home, the device automatically determines which cluster is currently present, identifies an authorizer, and asks to join the cluster. In this specification, a network device that supports both an authorizer and an kmbserver is called a 'cluster server.'

Each piece of content or each content stream in the home is protected with a unique key. These keys are called title keys. Each title key is encrypted with a master key for the particular home, called a binding key. To play protected content, a device reads the encrypted title key embedded in the content file and decrypts it with the binding key. Then, with the title key, the device decrypts the content itself. The binding key is calculated as the cryptographic hash of three quantities: the management key, the cluster ID, and a hash of the cluster's authorization table. The cluster ID is a unique identification code for a cluster established at cluster startup. The network authorization table is a simple file whose records represent the list of devices in the cluster.

Content providers need a binding key for a cluster to encrypt title keys to provide content encrypted so that it can only be decrypted by devices in the cluster. One way to get a cluster's binding key to a content server is for the content server to join the cluster. A content server, acting as a compliant device, may join a cluster as follows:

The content server broadcasts a "whosthere" message to a cluster network.

A cluster server answers with an "imhere" message, including cluster name, cluster server deviceID, cluster server device type, the cluster KMB, and a hash of a cluster authorization table.

The content server downloads the KMB from the cluster server.

The content server computes the cluster management key from the KMB and its own device keys.

The content server computes a message authorization code ("MAC") by cryptographically hashing the management key with the content server's deviceID and the content server's device type code.

The content server sends an authorization request to the cluster server, including the content server's deviceID and device type.

The cluster server computes the management key using the KMB and its own device keys. This management key is the same as the management key computed by the content server.

The cluster server computes the MAC using the content server's deviceID and device type, verifying the MAC received from the content server.

If the MAC matches, the cluster server adds the content server to its authorization table.

The cluster server sends an 'authorized' message to the content server, including an encrypted clusterID, encrypted with a content server key created by hashing the management key and the content server's deviceID.

The content server generates the content server key by hashing the management key and the content server's deviceID and uses the content server key to decrypt the encrypted clusterID.

The content server downloads the new authorization table from the cluster server.

The content server computes the binding key for the cluster by hashing the management key, a hash of the new authorization table, and the clusterID.

There are some drawbacks to this procedure. The content server broadcasts messages to clusters, which is not an appropriated procedure for a content server to perform. In addition, this procedure adds the content server as a device in the cluster, counting as a device against any maximum device count and changing the authorization table for the cluster. Moreover, the procedure is lengthy. There is an ongoing need for improvement therefore in procedures for controlling broadcast encryption of content for a network cluster from a content server outside the cluster.

SUMMARY OF THE INVENTION

Methods, systems, and products are disclosed for controlling delivery of broadcast encryption content for a network cluster from a content server outside the cluster that include receiving in the content server from the network device a key management block for the cluster, a unique data token for the cluster, and an encrypted cluster id and calculating a binding key for the cluster in dependence upon the key management block for the cluster, the unique data token for the cluster, and the encrypted cluster id. In typical embodiments, calculating a binding key includes calculating a management key from the key management block for the cluster; calculating a content server device key from the management key and the content server device id; decrypting the encrypted cluster id with the content server device key; and calculating the binding key with the management key, the unique data token for the cluster, and the cluster id.

In typical embodiments, calculating a content server device key includes hashing, with a one way cryptographic hash algorithm, the management key and the content server device id. In typical embodiments, calculating the binding key with the management key, the unique data token for the cluster, and the cluster id includes hashing, with a one way cryptographic hashing algorithm, the management key, the unique data token for the cluster, and the cluster id. Typical embodiments also include encrypting in the network device a cluster id in dependence upon a content server device id for the content server. Many embodiments also include receiving in the network device a content server device id. In typical embodiments, encrypting a cluster id includes calculating a content server device key and encrypting the cluster id with the content server device key.

In typical embodiments, calculating a content server device key includes hashing, with a one way cryptographic hash algorithm, the management key and the content server device id. Typical embodiments also include encrypting the title key with the binding key; embedding the encrypted title key in content for the cluster; and encrypting with a title key the content for the cluster.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for controlling delivery of broadcast encryption content for a network cluster from a content server outside the cluster. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Figure 1:
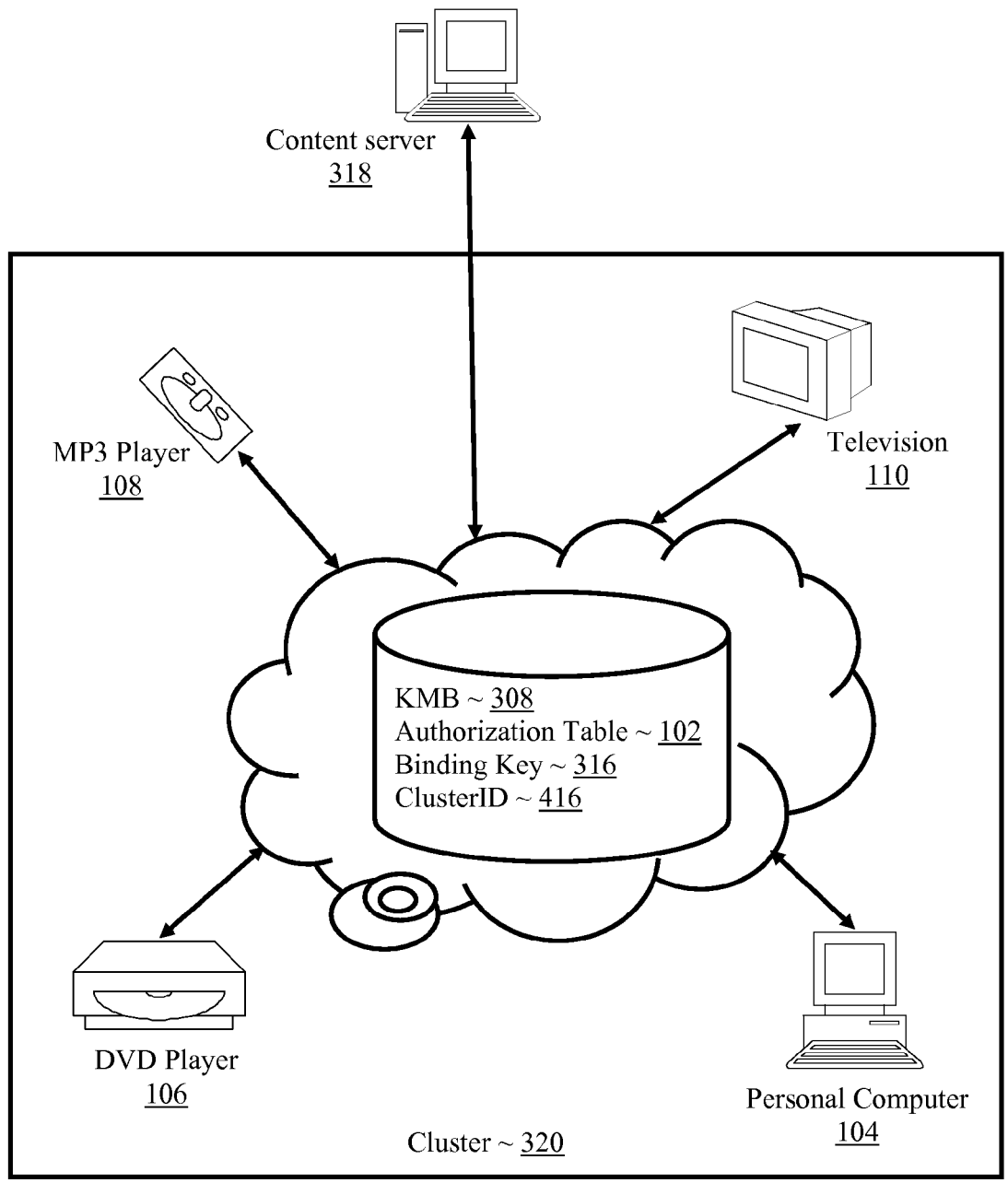
FIG. 1 sets forth a line drawing of an exemplary network architecture in which methods and systems according to embodiments of the present invention may be implemented.

Controlling Delivery of Broadcast Encryption Content for a Network Cluster from a Content Server Outside the Cluster Methods, systems, and products are disclosed for controlling delivery of broadcast encryption content for a network cluster from a content server outside the cluster that operate generally by providing the content server with enough information for it to package content for a specific cluster. FIG. 1 sets forth a line drawing of an exemplary network architecture in which methods and systems according to embodiments of the present invention may be implemented. The network of FIG. 1 includes an xPC compliant network cluster (320) that includes several xPC compliant network devices including an MP3 player (108), a television (110), a DVD player (106), and a personal computer (104).

The network cluster supports a key management block (308) for the cluster, an authorization table (102) that identifies all the devices currently authorized to join the cluster, a binding key (316) for the cluster, and a cluster ID (416). The key management block (308) is a data structure containing an encryption of a management key with every compliant device key. That is, the key management block contains a multiplicity of encrypted instances of a management key, one for every device key in the set of device keys for a device. The binding key (316) for the cluster is calculated as a cryptographic hash of a management key, a cluster ID, and a unique data token for the cluster. The management key for the cluster is calculated from the key management block (308) and device keys.

The network of FIG. 1 includes a content server (318) that is capable of encrypting content with title keys provided to it by content providers, content owners, or a legal licensing authority. Content server (318) is also capable of calculating a binding key for a cluster, given enough information about the cluster, and using the binding key to encrypt a title key and package it with encrypted contents. More particularly, content server (318) may control broadcast encryption of content for a network cluster (320) from outside the cluster by receiving from a network device in the cluster a key management block (308) for the cluster (320), a unique data token for the cluster (320), and an encrypted cluster id. The content server is capable of using the key management block (308) for the cluster (320), the unique data token for the cluster (320), and the encrypted cluster id to calculate the binding key for the cluster.

Figure 2:
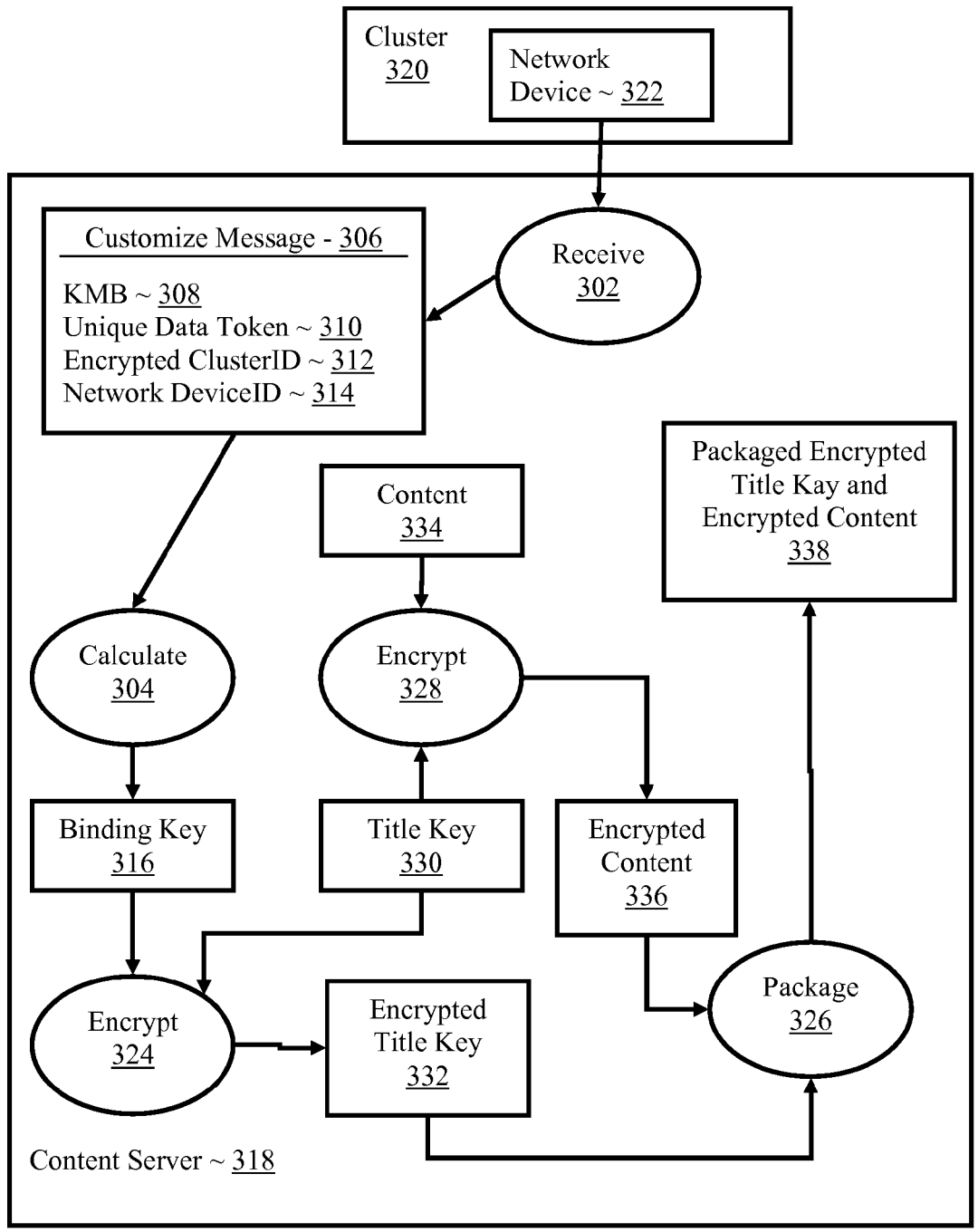
FIG. 2 sets forth a data flow diagram illustrating an exemplary method for controlling delivery of broadcast encryption content for a network cluster from a content server outside the cluster.

For further explanation, FIG. 2 sets forth a data flow diagram illustrating an exemplary method for controlling delivery of broadcast encryption content for a network cluster (320) from a content server (318) outside the cluster (320) that includes receiving (302) in the content server (318) from the network device (322) a key management block (308) for the cluster (320), a unique data token (310) for the cluster (320), and an encrypted cluster id (312). The unique data token (310) typically is produced by the network device (322) as a data value to be unique to the cluster at the time when it is received (302) in the content server (318). Examples of unique data tokens include a random number generated in the network device, a hash of an authorization table for the cluster, and others as will occur to those of skill in the art.

The method of FIG. 2 also includes calculating (304) a binding key (316) for the cluster (320) in dependence upon the key management block (308) for the cluster (320), the unique data token (310) for the cluster (320), and the encrypted cluster id (312). The method of FIG. 2 also includes encrypting (328) the content (334) for the cluster with a title key (330), encrypting (324) the title key (330) with the binding key (316); and packaging (326) the encrypted title key (332) with the encrypted content (336) for the cluster. In the example of FIG. 2, the message structure (306) for the key management block (308), the unique data token (310), and the encrypted cluster id (312) is referred to as a 'customize message' because the effect of encrypting the content for the cluster with a title key, encrypting the title key with the binding key, and packaging the encrypted title key with the encrypted content for the cluster is to create content that is 'customized' in that only devices in that cluster can decrypt it.

Encrypting the content for the cluster with a title key, encrypting the title key with the binding key, and packaging the encrypted title key with the encrypted content for the cluster prepares content for distribution to a requesting network device. This procedure involves no authentication of a requesting device by the content server because the process produces content encrypted with a title key that is in turn encrypted with a binding key so that the title key can only be decrypted in a network device in a cluster using that exact binding key. The content server may freely offer the content to any device that requests it. Only devices in a cluster having that binding key can decrypt the content.

The content server may calculate the binding key for a cluster, encrypt content for the cluster, and download the content all as part of a single overall transaction, for example, on a pay per view or pay per file type of transaction, where the content server does not retain the binding key beyond the duration of the single transaction. Alternatively, the content server may provide a subscription service, for example, in which it advantageously retains a cluster's binding key for a longer period of time. In such a case, the content server advantageously associates with the binding key in computer memory an identifier for the cluster, such as, for example, a requesting device ID or a base URL for the requesting device communicated to the content server as part of an initial handshake, for example.

Figure 3:
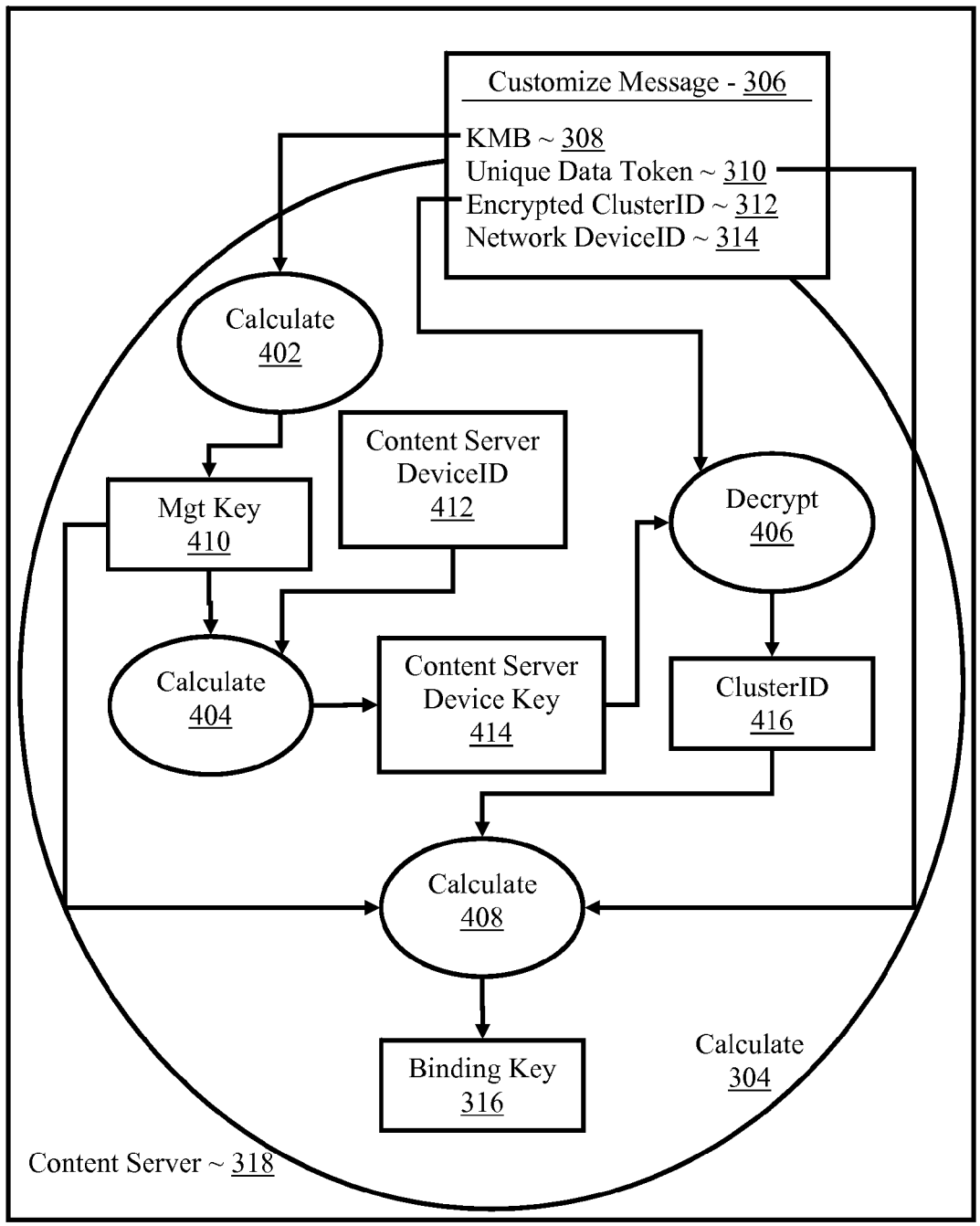
FIG. 3 sets forth a data flow diagram illustrating an exemplary method of calculating a binding key.

FIG. 3 sets forth a data flow diagram illustrating an exemplary method of calculating (304) a binding key (316) that includes calculating (402) a management key (410) from the key management block (308) for the cluster. A key management block may be implemented, for example, as a matrix of encrypted management keys, that is, a matrix made of the encryption of the management key using each different device key. A network device, in this example, content server (318), that knows a position in the matrix that was encrypted with its device key can calculate a management key by decrypting the value found at that position. The result is the management key.

The method of FIG. 3 also includes calculating (404) a content server device key (414) from the management key (410) and the content server device id (412). In the method of FIG. 3, calculating (404) a content server device key (414) is carried out by hashing, with a one way cryptographic hash algorithm, the management key (410) and the content server device id (412). The method of FIG. 3 also includes decrypting (406) the encrypted cluster id (312) with the content server device key (414).

The method of FIG. 3 also includes calculating (408) the binding key (316) with the management key (410), the unique data token (310) for the cluster, and the cluster id (416). In the method of FIG. 3, calculating (408) the binding key (316) with the management key (410), the unique data token (310) for the cluster, and the cluster id (416) is carried out by hashing, with a one way cryptographic hashing algorithm, the management key (410), the unique data token (310) for the cluster, and the cluster id (416).

Figure 4:
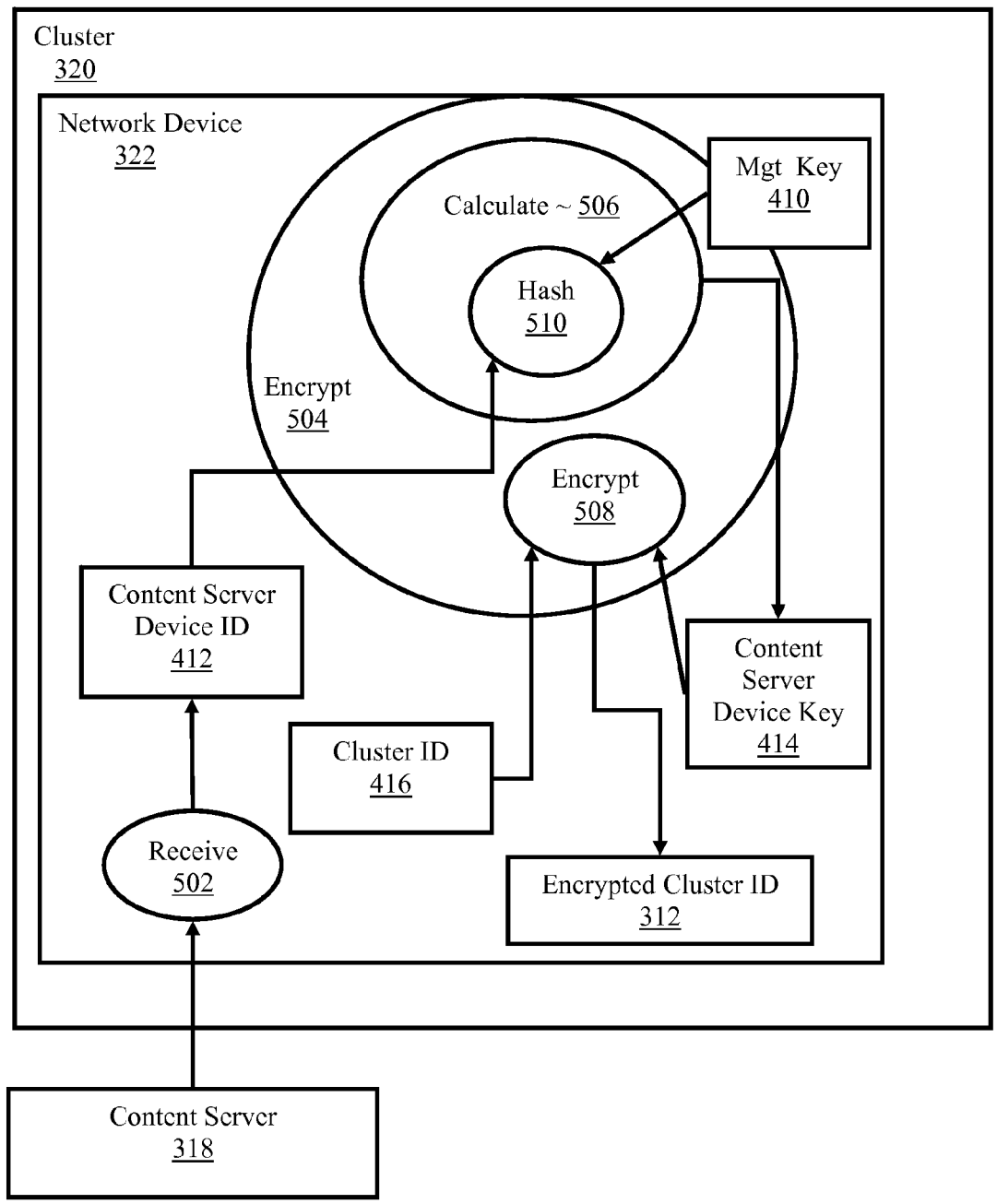
FIG. 4 sets forth a data flow diagram illustrating an exemplary method for encrypting a cluster id in a network device.

FIG. 4 sets forth a data flow diagram illustrating an exemplary method for encrypting (504) in the network device (322) a cluster id (416) in dependence upon a content server device id (412) for the content server (318). The method of FIG. 4 includes receiving (502) in the network device (322) a content server device id (412) from a content server (318). Alternatively, the network device receives the content server device ID (412) by retrieving the content server device ID from a content server device ID table, a network location, an on-line directory, or from any other source as will occur to those of skill in the art.

In the method of FIG. 4, encrypting (504) a cluster ID (416) includes calculating (506) a content server device key (414) and encrypting (508) the cluster id (416) with the content server device key (414). In the method of FIG. 4, calculating (506) a content server device key (414) is carried out by hashing (510), with a one way cryptographic hash algorithm, the management key (410) and the content server device id (412).

For further explanation, a use case is presented that illustrates a content server calculating a binding key for a cluster where the content server's device ID is provided to a network device in the cluster as part of an initial handshake:

A network device sends a request for a binding server to prepare content for use in the device's cluster.
    The content server sends its content server device ID to a network device in a cluster.

The network device calculates a content server key as a hash of the management key for the cluster and the content server device ID.

The network device uses the content server key to encrypt its cluster ID.

The network device produces a unique data token for its cluster.

The network device sends to the content server the key management block for the cluster, the network device ID, the unique data token for the cluster, and the encrypted cluster ID.

The content server encrypts content for the cluster with a title key.

The content server computes the management key from the key management block using its own device key.

The content server computes the content server key as a hash of the management key and the content server device ID.

The content server decrypts the cluster ID with the content server key.

The content server creates a binding key as a hash of the management key, the unique data token for the cluster, and the now decrypted cluster ID.

The content server encrypts the title key with the binding key.

The content server packages the encrypted title key with the content.

The content server sends the packaged encrypted content and encrypted title key to the network device.

Beginning with a request from a network device, this procedure involves no broadcast from the content server. The initial request is decoupled from any download of content which may occur as part of the same overall transaction with the request for preparation of content or may occur later or over a period of time. In this procedure, the content server does not join the cluster and the content server's operations therefore have no effect on the cluster's authorization table.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for controlling the delivery of broadcast encryption content for a network cluster from a content server outside the cluster, the system comprising:
    means for receiving in the content server from a network device a key management block for the cluster, a unique data token for the cluster, and a encrypted cluster id; and
    means for calculating a binding key for the cluster in dependence upon the key management block for the cluster, the unique data token for the cluster, and the encrypted cluster id, further comprising:
        means for calculating a management key from the key management block for the cluster;
        means for calculating a content server device key from the management key and the content server device id, further comprising means for hashing, with a one way cryptographic hash algorithm, the management key and the content server device id;
        means for decrypting the encrypted cluster id with the content server device key; and
        means for calculating the binding key with the management key, the unique data token for the cluster, and the cluster id, further comprising means for hashing, with a one way cryptographic hashing algorithm, the management key, the unique data token for the cluster, and the cluster id;
    and wherein the system further comprises:
        means for encrypting the content for the cluster with a title key;
        means for encrypting the title key with the binding key;
        means for packaging the encrypted title key with the encrypted content for the cluster;
        means for receiving in the network device a content server device id; and
        means for encrypting in the network device a cluster id in dependence upon a content server device id for the content server including:
            means for calculating a content server device key, wherein calculating a content server device key further comprises means for hashing, with a one way hash algorithm, the management key and the content server device id; and
            means for encrypting the cluster id with the content server device key.

2. A computer program product for controlling the delivery of broadcast encryption content for a network cluster from a content server outside the cluster, the computer program product comprising:
    a recording medium;
    means, recorded on the recording medium, for receiving in the content server from a network device a key management block for the cluster, a unique data token for the cluster, and a encrypted cluster id; and
    means, recorded on the recording medium, for calculating a binding key for the cluster in dependence upon the key management block for the cluster, the unique data token for the cluster, and the encrypted cluster id, wherein calculating a binding key further comprises:
        means, recorded on the recording medium, for calculating a management key from the key management block for the cluster;
        means, recorded on the recording medium, for calculating a content server device key from the management key and the content server device id, wherein wherein means, recorded on the recording medium, for calculating a content server device key further comprises means, recorded on the recording medium, for hashing, with a one way cryptographic hash algorithm, the management key and the content server device id;
        means, recorded on the recording medium, for encrypting the encrypted cluster id with the content server device key; and
        means, recorded on the recording medium, for calculating the binding key with the management key, the unique data token for the cluster, and the cluster id, wherein wherein means, recorded on the recording medium, for calculating the binding key with the management key, the unique data token for the cluster, and the cluster id further comprises means, recorded on the recording medium, for hashing, with a one way cryptographic hashing algorithm, the management key, the unique data token for the cluster, and the cluster id;
    and wherein the system further comprises:
        means. recorded on the recording medium, for encrypting the content for the cluster with a title key;
        means, recorded on the recording medium, for encrypting the title key with the binding key;

means, recorded on the recording medium, for packaging the encrypted title key with the encrypted content for the cluster;

means, recorded on the recording medium, for receiving in the network device a content server device id; and means, recorded on the recording medium, for encrypting in the network device a cluster id in dependence upon a content server device id for the content server including:

means, recorded on the recording medium, for calculating a content server device key, wherein means, recorded on the recording medium, for calculating a content server device key further comprises means, recorded on the recording medium, for hashing, with a one way hash algorithm, the management key and the content server device id; and means, recorded on the recording medium, for encrypting the cluster id with the content server device key.

* * * * *